United States Patent [19]
Dente et al.

[11] Patent Number: 5,625,615
[45] Date of Patent: Apr. 29, 1997

[54] OPTICAL STORAGE DRIVE EMPLOYING VARIABLE WRITE SPEED FOR REDUCED LASER WRITE POWER

[75] Inventors: James J. Dente, Longmont, Colo.;
Blair I. Finkelstein, Tucson, Ariz.;
Marc E. Goldfeder, Tucson, Ariz.;
Michael T. Solan, Tucson, Ariz.;
Daniel J. Winarski, Tucson, Ariz.

[73] Assignee: International Business Machines Corporation, Armonk, N.Y.

[21] Appl. No.: 569,646

[22] Filed: Dec. 8, 1995

[51] Int. Cl.⁶ .................... G11B 7/00; G11B 15/46
[52] U.S. Cl. .................. 369/116; 369/54; 360/73.01; 360/73.06
[58] Field of Search .................. 369/47, 48, 49, 369/50, 54, 58, 60, 116; 360/73.06, 73.01, 73.03, 73.04, 73.08

[56] References Cited

U.S. PATENT DOCUMENTS

| | | | |
|---|---|---|---|
| 4,937,809 | 6/1990 | Miyadera et al. | 369/116 |
| 5,003,529 | 3/1991 | Ikeda | 369/116 |
| 5,134,606 | 7/1992 | Sekiguchi et al. | 369/116 |
| 5,315,402 | 5/1994 | Ito et al. | 358/342 |
| 5,349,479 | 9/1994 | Arimura et al. | 360/73.06 |
| 5,390,162 | 2/1995 | Fukumoto et al. | 369/116 |

*Primary Examiner*—P. W. Huber
*Attorney, Agent, or Firm*—Baker, Maxham, Jester & Meador

[57] ABSTRACT

By adjusting the advancement rate of an optical data storage medium in response to the amount of data to be written, and operating a laser with a minimum amount of write laser power level for the particular advancement rate to achieve a desired level of write effectiveness, data signals are written to the optical medium with a minimum amount of power. Where the optical medium comprises an optical disk, choosing the rate of disk rotation selectively establishes the advancement rate. Similarly, where the optical medium comprises an optical tape, choosing the rate of tape advancement from source reel to take-up reel selectively establishes the advancement rate. Preferably, the advancement rate is increased or decreased depending upon whether a greater or lesser quantity or write length of data resides in a write queue. The invention may be implemented, for example, to provide a process, apparatus or program storage medium useful for laser storage of digital data signals to an optical data storage medium with minimal power consumption.

50 Claims, 4 Drawing Sheets

OPTICAL STORAGE DRIVE EMPLOYING VARIABLE WRITE SPEED FOR REDUCED LASER WRITE POWER

BACKGROUND OF THE INVENTION

1. Field of the Invention

The present invention generally relates to the storage of digital data signals in optical data storage media. More particularly, the invention concerns the storage of digital data signals to an optical data storage medium with minimal power consumption, achieved by adjusting the advancement rate of the optical medium in response to the amount of data to be written, and by establishing a minimum laser write power level necessary to achieve a desired level of write effectiveness under the adjusted advancement rate.

2. Description of the Related Art

It is generally desirable to advance digital data recording media as fast as possible during read and write operations. "Advancing" disc media refers to the rotation of the disc, whereas advancing tape media refers to the movement of the tape from a source reel to a take-up reel.

Advancing the media at a higher rate increases the "effective data rate." When reading data from the media, having a faster advancement rate translates into reading data more quickly, e.g. more bits per second. Analogously, having a faster advancement rate when writing data to the media translates into writing data more quickly. However, in optical storage drives where a laser writes data to a disk, greater advancement rates demand that the laser be operated at a higher power level. Unfortunately, this reduces laser life.

Some known systems are said to adjust optical laser write power while writing to optical disc media. See, for example, U.S. Pat. No. 5,390,162 to Fukumoto et al. and U.S. Pat. No. 5,134,606 to Sekiguchi et al. In the '162 patent, for example, a magneto-optical disk is rotated at a constant angular velocity, and a detecting unit detects the radial position of the magneto-optical disk. The laser power and external magnetic field are controlled depending on the output of the detecting unit to keep the size of an effective reproducing region constant without regard to the linear velocity at each reproducing position. The '162 disclosure therefore seeks to vary laser power to automatically to account for the increasing linear velocity that occurs at outer radial regions of the disk. This is apparently performed to ensure that adequate write laser power is supplied, at such regions, where the linear velocity is faster. Although this approach purports to maintain uniform laser write effectiveness, it still does not address the need of some users to minimize power usage in optical storage drives. Other known approaches are similarly lacking.

SUMMARY OF THE INVENTION

Broadly, the invention stores digital data signals to an optical data storage medium with minimal power consumption by adjusting the advancement rate of the optical medium in response to the amount of data to be written and establishing the minimum laser write power level necessary to achieve a desired level of write effectiveness under the adjusted advancement rate.

If the optical medium comprises an optical disc, selecting the advancement rate involves choosing the disk's rate of rotation; similarly, if the optical medium comprises an optical tape, selecting the advancement rate involves choosing the rate of tape advancement from source reel to take-up reel.

Preferably, the advancement rate is increased or decreased depending upon whether a greater or lesser quantity of data resides in a write buffer. The write buffer may comprise, for example, a memory unit such as a cache memory for intermediate storage of data to be ultimately stored on optical media in the storage drive.

The invention affords a number of distinct advantages. Advantageously, the invention accelerates write operations when there is a greater amount of data awaiting. Also, the invention increases the useful life of lasers in optical storage drives by minimizing laser power consumption during write operations. By reducing power consumption, the invention also reduces the costs of operating the storage drive. The invention also provides other benefits, many of which are described below.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS STRUCTURE

Figure 1:
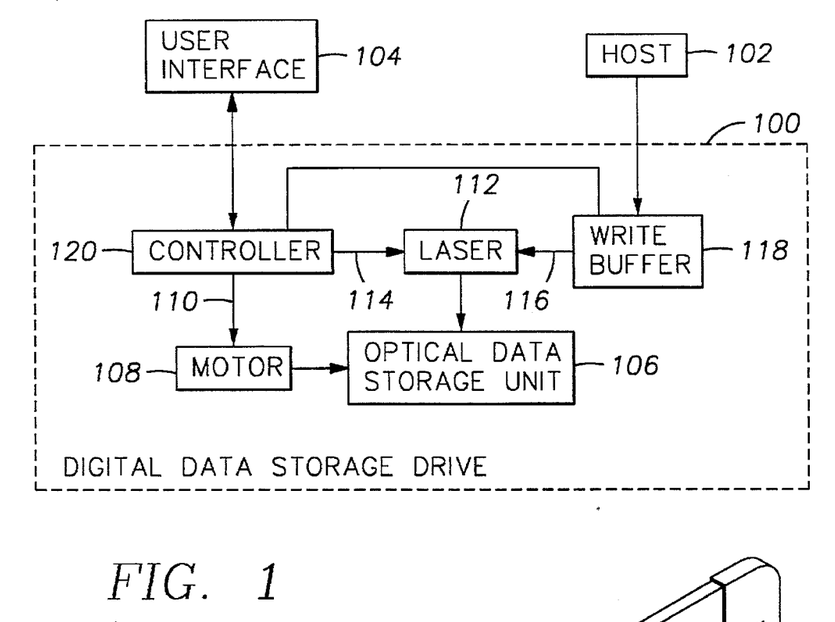
FIG. 1 depicts a diagram of the hardware components and interconnections of a preferred embodiment of the invention.

In one preferred embodiment, the invention may be implemented in the hardware environment of FIG. 1. Particularly, the hardware of the invention includes a digital data storage drive 100, with a number of sub-components described below. The storage drive 100 may be coupled to a host 102, such as a mainframe computer, personal computer, or other data processing machine. The storage drive 100 is also coupled to a user interface 104 to exchange certain information with a user (not shown), as discussed in greater detail below. The user interface 104 preferably comprises a device (such as a keyboard) for the user to transmit machine-readable input to the storage drive 100, as well as a device (such as a video monitor) for the storage drive 100 to present human-readable output to the user.

A chief sub-component of the storage drive 100 is the optical data storage unit 106. The unit 106 comprises one or more storage media, which may utilize a number of different optical storage formats, such as magneto-optical disk storage, WORM optical disc storage, phase-change optics, etc. Although the following discussion addresses the optical data storage unit 106 in the context of a single disk or tape medium, the optical data storage unit 106 may also comprise multiple individual media that are individually accessible by the optical storage unit 106.

The storage drive 100 also includes a motor 108, coupled to the storage unit 106. Depending upon the type of optical media used, the motor 108 may comprise an electric motor of the type that is known for rotating optical disks or advancing optical tape from a source reel to a take-up reel (not shown). The motor 108 has an advancement input line 110 to receive an advancement input signal, discussed in greater detail below.

The storage drive 100 also includes a laser 112 positioned appropriately to accurately cast a beam of laser light upon the optical storage unit 106. The laser 112 has a power input line 114 and a data input line 116 to receive power level signals and data signals, respectively, as discussed in greater detail below.

The laser 112 preferably includes a semiconductor device, such as a Nd:YAG laser, and may be integrated into a write unit that includes a buffer (not shown) and a buffer manager (not shown) to perform queuing and other managing of data signals received over the data input line 116. The data input line 116 connects the laser 112 to a write buffer 118, which is itself coupled to the host 102. Alternatively, the write buffer 118 may be incorporated into the host 102 instead of the storage drive 100. The write buffer 118 preferably comprises a circuit of fast-access memory such as random access cache memory.

The power input line 114 connects the laser 112 to a controller 120. As explained in greater detail below, the controller 120 comprises a circuit to select and implement the write power level of the laser 112, and also to select and implement the speed of media advancement provided by the motor 108. The controller 120 may comprise, for example, a microprocessor and associated memory, programmed to generate an advancement signal in accordance with certain predetermined criteria, and programmed to choose a write power signal in accordance with certain other predetermined criteria.

The controller 120 is coupled to the user interface 104, to exchange information concerning the operation of the storage drive 100. The controller 120 is also coupled to the write buffer 118, to aid in determining how full the write buffer is, i.e. the write queue's percentage occupancy or write length, as discussed in greater detail below.

OPERATION

In addition to the various embodiments of hardware described above, this invention contemplates various processes for operating such hardware. Preferably, the storage drive 100 functions under one of various user-selected "operating modes" (described below), which are selected by the user via the interface 104. Alternatively, the storage drive 100 may be operated continually in a single one of the operating modes.

Figure 4:
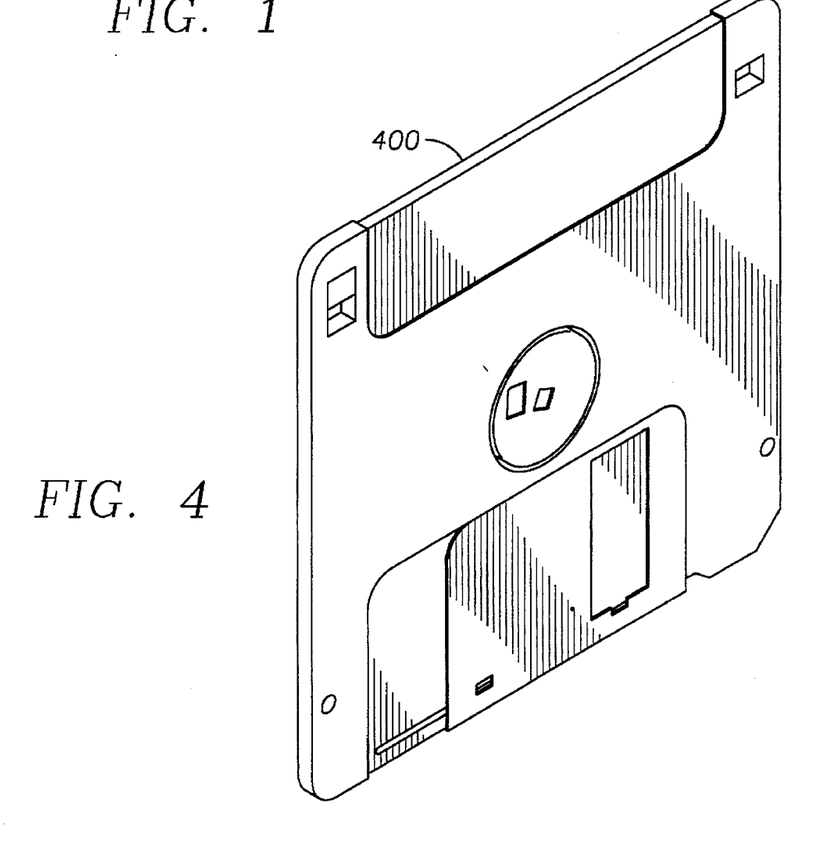
FIG. 4 depicts an illustrative data storage device in accordance with the invention.

In an illustrative embodiment of the invention, the process of operating the storage drive 100 may be implemented by the controller 120 executing a series of instructions. These instructions may reside in a program storage medium such as RAM (not shown) of the storage drive 100. Alternatively, the instructions may be contained on another program storage medium such as a computer diskette 400 (FIG. 4). Or, the instructions may also be stored on a DASD array, magnetic tape, conventional "hard drive", electronic read-only memory, optical storage device, paper "punch" cards, and so on. In an illustrative embodiment of the invention, the computer-executable instructions may comprise lines of compiled microprocessor assembly code recorded in nonvolatile memory of the drive 100 and loaded into fast-access memory of the controller 120 prior to operation of the controller.

The storage drive's multiple operating modes, mentioned above, are described in greater detail as follows.

Fixed-Speed Operating Mode

In this mode, the controller 120 instructs the motor 108 to advance the optical storage unit 106 at a fixed speed; this speed may be user-selected or it may be permanently established instead. Preferably, the user selects the desired fixed speed of media advancement using the interface 104. The controller 120 converts the desired advancement rate into a signal compatible with the motor 108, and provides this signal to the motor 108 via the advancement input line 110. The advancement rate may comprise, for example, an angular velocity or R.P.M. figure in the case of optical disks, or a speed of traversal past a read/write head in the case of optical tape.

While the motor 108 is advancing the optical storage unit 106 at the fixed speed, input data that has been received from the host 102 and stored into the write buffer 118 is transferred to the laser 112 for writing to the storage unit 106. This data is written to the unit 106 using a laser write power level established by the controller 120. Preferably, the write power level is the minimum write power level necessary for the laser 112 to achieve a specific level of write effectiveness, considering the present advancement rate and the particular type of media being used. For example, the minimum write power may comprise the minimum power level necessary for the laser 112 to successfully write data to the optical medium without errors. The selected write power level must also consider the advancement rate, since greater speeds of optical media advancement warrant greater write power levels. The write power level may also vary depending upon the particular type of optical media, e.g. magneto-optical, phase change, ablative, etc. As is known, optical storage drives operate by using a laser beam to cause a heat-induced change in magnetism or physical state in the optical media. The write power level must therefore be sufficient to reliably affect the necessary change. A safety factor may also be added to the minimum write power level, to help avoid write errors due to insufficient write power.

For ease of implementation, the controller 120 may select the write power level by referencing a lookup table (not shown) contained in memory aboard the controller 120 or another location. For each advancement rate provided by the motor 108, the lookup table lists a corresponding recommended minimum write power level. The lookup table may also contemplate the specific type of media, e.g. magneto-optical, phase change, ablative, etc.

Table 1 (below) illustrates an example of such a lookup table for magneto-optical disk media. Table 1 reflects an established standard ("1×") advancement rate for operating the motor 108 at a reference speed. At the standard rate, the appropriate write power level is 6 mW. Since the laser write power level varies with the square root of the disk's rate of rotation (in R.P.M.), laser write power levels of 8.5 mW and 12 mW are required for advancement rates that are double ("2×") and quadruple ("4×") the standard rate, respectively.

TABLE 1

| Recording Speed | Laser Write Power (Empirical) | Laser Write Power (Theoretical) |
| --- | --- | --- |
| Standard Speed (1×) | 6.25 ± 0.75 mW | 1.0 * 6 = 6 mW |
| Double Speed (2×) | 9 ± 1.0 mW | 1.414 * 6 = 8.5 mW |
| Quadruple Speed (4×) | 11.5 ± 1.5 mW | 2.0 * 6 = 12 mW |

In practice, however, the inventors have empirically determined that the actual laser write power levels may be closer to 6.25±0.75 mW, 9±1.0 mW, and 11.5±1.5 mW for the 1×, 2×, and 4× advancement rates, respectively.

Variable-Speed Operating Modes: Generally

Broadly, in these operating modes the controller 120 directs the motor 108 to advance the optical medium of the storage unit 106 at a variable speed, depending upon the quantity (or write length) of data in the write buffer 118 awaiting optical storage. The variable-speed operating modes include a cache-activated mode and a length-activated mode, described in greater detail below. As in the fixed-speed mode, the laser's write power level is adjusted to minimize power consumption while ensuring a desired level of write effectiveness.

Figure 2:
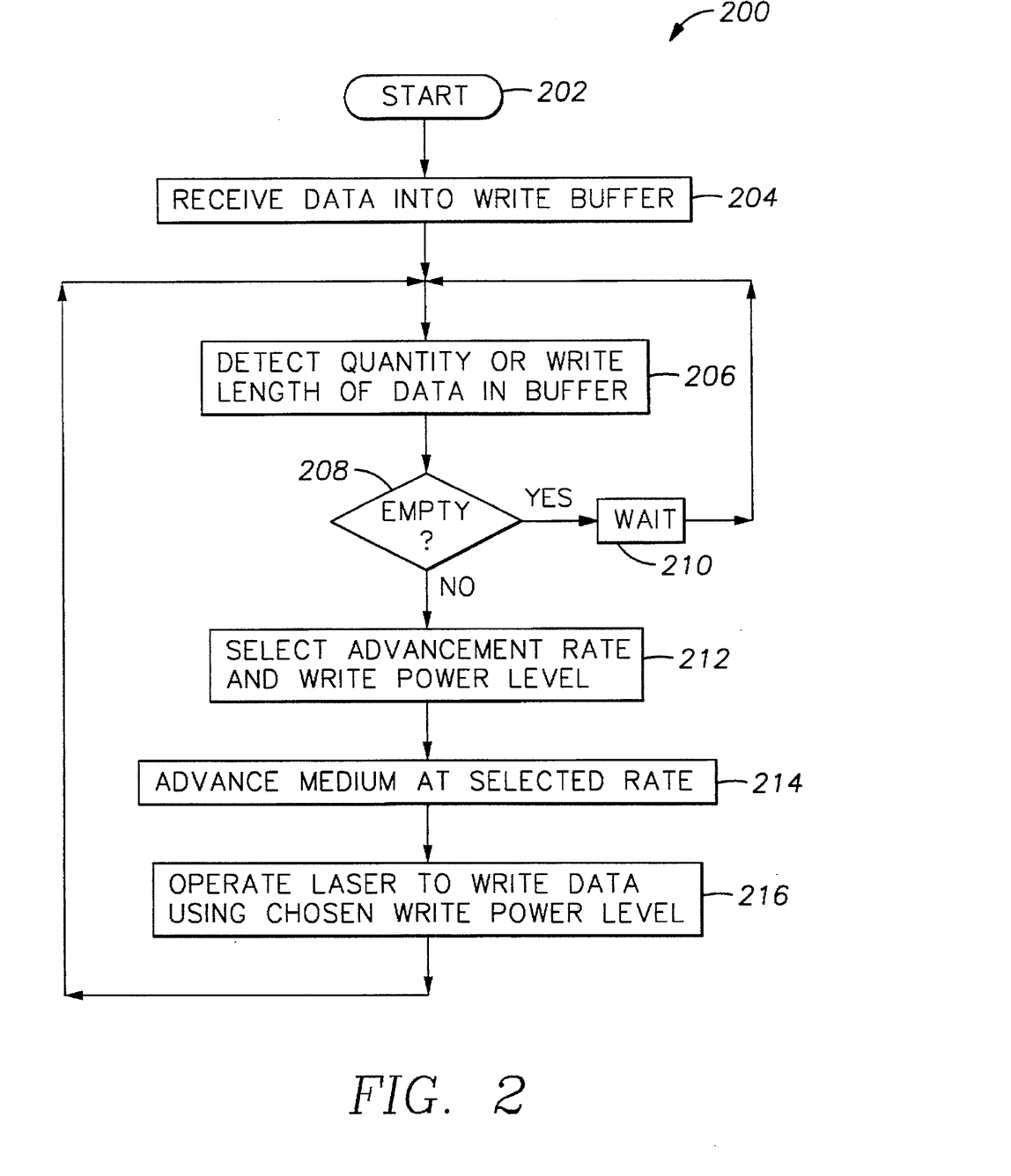
FIG. 2 depicts a flowchart illustrating a sequence of steps for implementing a process in accordance with the present invention.

FIG. 2 illustrates an exemplary sequence 200 of operation generic to the variable-speed operating modes. After the sequence 200 begins in task 202, task 204 receives some data into the write buffer 118. The controller 120 in task 206 then detects the quantity (cache-activated mode) or write length (length-activated mode) of data contained in the write buffer 118. If the controller 120 in query 208 determines that the write buffer 118 is empty, the controller 120 in task 210 waits for a predetermined time period before returning to task 206 to search for data again.

When the controller 120 detects data in the write buffer 118, it selects an advancement rate and write power level in task 212. The advancement rate is selected in response to the quantity or length of data in the write buffer 118—faster advancement rates more quickly write the pending data. The write power level is selected to minimize the laser's power consumption, this parameter being preferably obtained by referencing a lookup table, as discussed above in describing the fixed-speed operating mode.

Having established the advancement rate and write power level, the controller 120 in task 214 instructs the motor 108 to advance the optical storage unit 106 at the rate established in task 212. In the case of an optical disk, task 214 involves rotating the disk at the established advancement rate, which many comprise a number of R.P.M.s or an angular velocity, for example. With the unit 106 rotating at the established rate, the controller 120 in task 216 directs the laser 112 to write data from the write buffer 118 to the storage unit 106, using the write power level established in task 212. After writing a predetermined amount of data, such as a "file" or a number of files, control returns to task 206 to re-evaluate the contacts of the write buffer 118.

Cache-Activated Operating Mode

In the cache-activated mode, the controller 120 instructs the motor 108 to advance the optical medium of the storage unit 106 at speeds that vary depending upon the quantity of data in the write buffer 118 awaiting storage. The "quantity" of data refers to the storage space occupied by the data, i.e. the number of bytes, bits, words, or another appropriate unit of measurement.

Figure 3A:
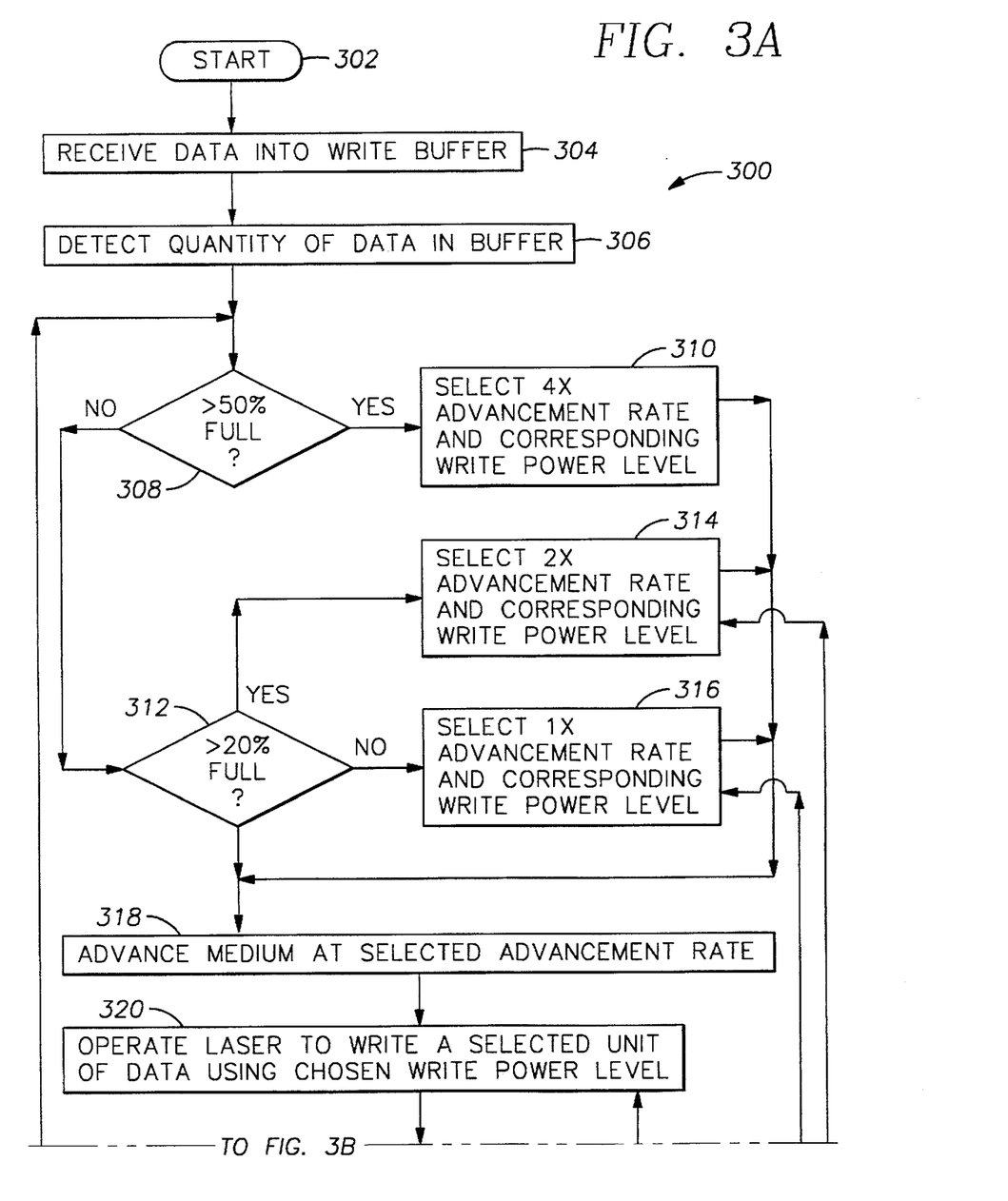
FIGS. 3A–3B depict a flowchart illustrating a more detailed sequence of steps for implementing a process in accordance with the invention.
Figure 3B:
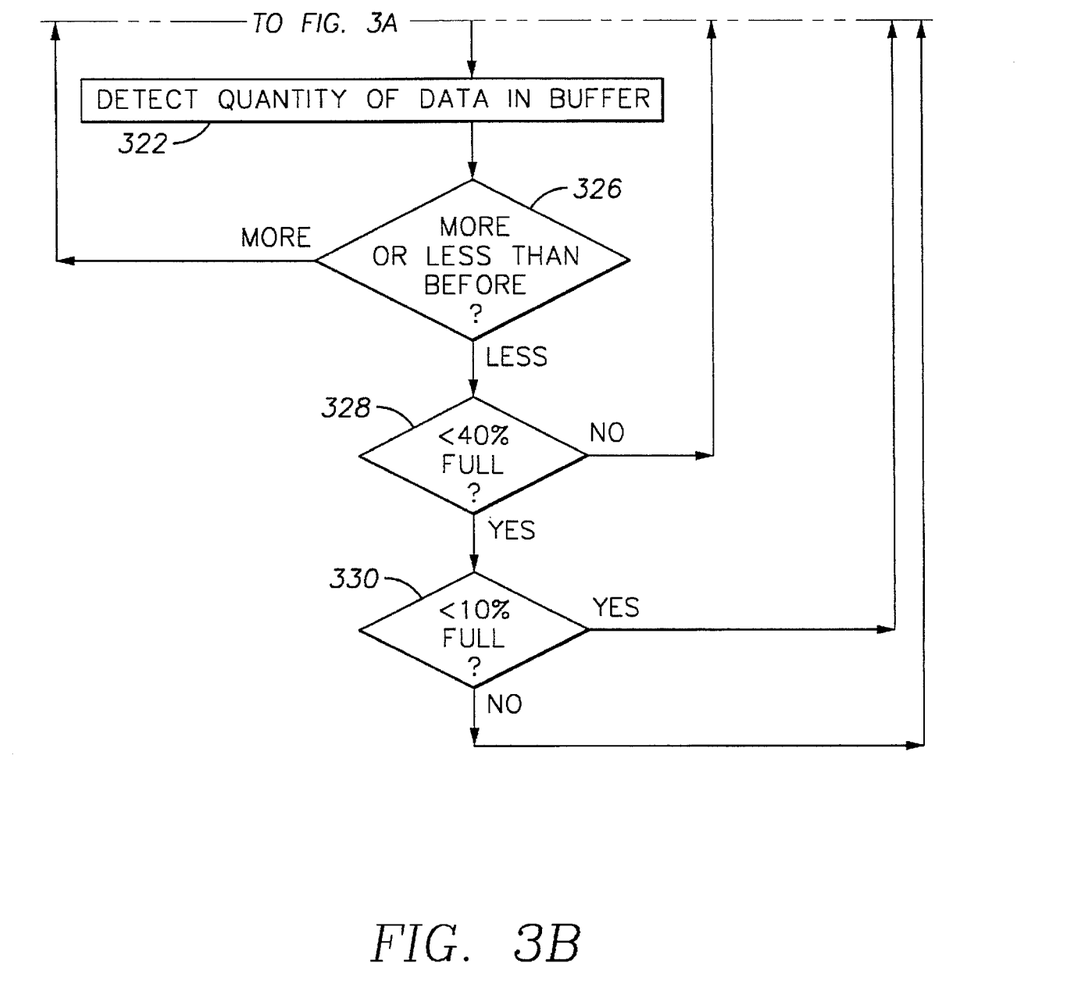

FIGS. 3A–3B illustrate a detailed flowchart illustrating an exemplary sequence of steps 300 implementing the cache-activated mode. After the routine 300 starts in task 302, the write buffer 118 in task 304 receives data from the host 102, intended for ultimate storage by the optical storage unit 106. Next, the controller 120 in task 306 detects the quantity of data in the write buffer 118.

The controller 120 then determines what "range" this quantity falls under, i.e. more than 50% full, greater than 20% but not exceeding 50% full, or 20% full or less. The controller 120 uses the resulting range to determine the advancement rate for the optical storage unit 106—fast (4×), medium (2×), or slow (1×), respectively. Specifically, the controller 120 in query 308 determines whether the write buffer 118 is more than 50% full. If so, control advances to task 310, where the 4× advancement rate is selected, to rapidly transfer data from the write buffer 118 to the storage unit 106. If the write buffer 118 is not more than 50% full, query 308 directs control to query 312, which asks whether the write buffer 118 is more than 20% full. If so, the 2× advancement rate is selected in task 314, to transfer data from the write buffer 118 to the storage unit 106 at a moderate rate. If the write buffer 118 is not more than 20% full, queries 308 and 312 direct control to task 316, where the 1× advancement rate is selected, to transfer data from the write buffer 118 to the storage unit 106 at a slower, power-saving rate.

As shown above, tasks 310, 314, and 316 select the 4×, 2×, or 1× advancement rates in appropriate cases. In each of tasks 310, 314, and 316, the controller 120 additionally consults its lookup table, discussed above, to select a write power level appropriate to the selected advancement rate and particular type of medium present in the optical storage unit 106.

After tasks 310, 314, or 314 (as applicable), control advances to task 318, where the controller 120 places a command upon the line 110, instructing the motor 108 to operate at the advancement rate selected in tasks 310, 314, or 316, i.e. the 4×, 2×, or 1× rate. In task 320, the controller 120 places a command upon the line 114, preparing the laser 112 for operation at the write power level that was selected in tasks 310, 314, or 316. Also in task 320, the controller 120 directs the laser 112 to write a selected unit of data from the write buffer 118 to the optical storage unit 106. The selected unit of data preferably comprises a contiguous and conveniently separable group of data, such as one or more "files".

After writing the selected unit of data to the optical storage unit 106, the controller 120 in task 322 detects the quantity of data remaining in the write buffer 118. Although this quantity may have decreased due to the transfer of data out of the buffer 118 in task 320, it may have increased if the host 102 has meanwhile forwarded additional data to the write buffer 118. Accordingly, the controller 120 in query 326 determines whether the quantity of data in the write buffer 118 (detected in task 322) is greater or less than the quantity previously detected (i.e. in task 306 or a previous performance of task 322). If there is now more data, control returns to query 308. If less, control advances to queries 328 and 330, which help to slow the advancement rate as the quantity of data in the write buffer 118 decreases.

Specifically, the controller 120 in query 328 asks whether the write buffer 118 is less than 40% full. If the write buffer 118 is 40% full or greater, control advances to task 320, where the controller 120 operates the laser 112 to write another selected unit of data to the write buffer 118 using the previously established write laser power. In task 320, the motor 108 continues to use the previously selected advancement rate. This advancement rate may be 4× (e.g., if the quantity of data detected previously in task 306 exceeded 50%), or 2× (e.g., if the quantity of data detected previously in task 306 exceeded 40% but did not surpass 50%).

If query 328 determines that the write buffer 118 is less than 40% full, however, control advances to query 330, which asks whether the write buffer 118 is less than 10% full. If not, this means that the write buffer 118 is less than 40% full, but at least 10% full; in this case, the write buffer 118 contains a moderate quantity of data, so the laser 112 should be operated to write data to the optical storage unit 106 at a medium speed. Accordingly, control advances to task 314, where the controller 120 selects the 2× advancement rate and the appropriate accompanying write power level. The write power level is selected as discussed previously.

If, however, query 330 finds that the write buffer 118 is less than 10% full, the write buffer 118 contains very little data, and the laser 112 may be operated at a slow, power-saving speed to write the data to the optical storage unit 106. Accordingly, after an affirmative answer to query 330, control advances to task 316, where the controller 120 selects the 1× advancement rate and the appropriate accompanying write power level.

The ranges established at 40% and 10%, of course, may be varied to hasten or retard reductions in the motor's advancement rate. Likewise, the ranges defined at 50% and 20% may be varied to hasten or retard increases in the motor's advancement rate. Preferably, however the ranges used in increasing advancement rate (i.e. 50% and 20% in the present illustration) differ from the ranges used in decreasing advancement rate (i.e. 40% and 10% in the present illustration). Using different ranges in this fashion helps prevent the "churning" by the motor 108. Churning may occur, for example, if the motor's advancement rate inefficiently jumps back and forth between two adjacent advancement rates, owing to small fluctuations in the contents of the write buffer 118. Therefore, utilizing contrasting numbers in queries 308/312 with respect to queries 328/330 helps prevent undue stress on the motor 108.

Length-Activated Mode

The length-activated operating mode provides an alternative to the cache-activated mode. In the length-activated mode, the controller 120 instructs the motor 108 to advance the optical storage unit 106 of the storage unit 106 at a variable speed, depending upon the length of time ("write length") required to write data contained in the write buffer 118 to the optical media. In other words, instead of using percentage of write buffer occupancy, the controller 120 in the length-activated mode determines the advancement rate by monitoring the length (in seconds or another suitable unit of time) that would be required to write all data stored in the write buffer 118.

In an example of this embodiment, queries 308, 312, 328, and 330 may be replaced with the following queries, respectively:

1. write length>10 seconds?
2. write length>20 seconds?
3. write length<15 seconds?
4. write length<5 seconds?

In the length-activated mode, like the cache-activated mode, the numbers of queries 308/312 preferably differ from the numbers of queries 328/330 to prevent churning of the motor 108.

OTHER EMBODIMENTS

While there have been shown what are presently considered to be preferred embodiments of the invention, it will be apparent to those skilled in the art that various changes and modifications can be made herein without departing from the scope of the invention as defined by the appended claims.

For example, although the lasers have been described herein as an exemplary data storage device, the invention also contemplates other data storage components to store data on optical data storage media. For example, a suitable storage component may comprise a magnetic field generator, an electronic beam generator, or another suitable device for storing data on optical data storage media. Of course, the best type of storage device to use depends upon the particular type of optical media being used, e.g. magneto-optical, phase change, ablative, etc.

What is claimed is:

1. A process for storing digital data signals to a optical data storage medium with a laser, said data storage medium having a physical composition, comprising the steps of:

receiving and storing digital data into a buffer;

detecting a quantity of digital data stored in the buffer;

selecting a rate for advancing the optical data storage medium, said rate being proportional to the quantity of digital data stored in the buffer;

in accordance with the selected rate and the data storage medium's physical composition, identifying a minimum write power level at which the laser is capable of a predetermined level of effectiveness in writing data to the optical data storage medium being advanced at the selected rate;

advancing the optical data storage medium at the selected rate; and operating the laser, at the identified minimum write power level, to write at least some of the digital data to the medium while advancing the medium at the selected rate.

2. The process of claim 1, further comprising the steps of repeating the detecting, selecting, identifying, advancing, and operating steps.

3. The process of claim 1, wherein the optical data storage medium comprises an optical disk medium, and the advancing step comprises the step of rotating the optical disk medium at the selected rate.

4. The process of claim 3 wherein the selected rate comprises an angular velocity.

5. The process of claim 1, wherein the optical data storage medium comprises an optical tape medium, and the advancing step comprises the step of spooling the optical tape medium from a source reel to a take-up reel past a tape head at the selected rate.

6. The process of claim 5, wherein the selected rate comprises a linear velocity.

7. The process of claim 1, wherein the buffer comprises a cache memory.

8. The process of claim 1, wherein the selecting step is performed prior to the setting step.

9. The process of claim 1, wherein the selecting step is performed concurrently with the identifying step.

10. The process of claim 1, wherein the selecting step is performed after the identifying step.

11. The process of claim 1, said digital data including multiple files, and the operating step comprising the steps of operating the laser at the minimum write power level to write a number of the files to the medium while advancing the medium at the selected rate.

12. The process of claim 1, wherein the optical data storage medium comprises an optical card.

13. The process of claim 1, wherein the optical data storage medium comprises a holographic storage medium.

14. The process of claim 1, wherein the optical data storage medium comprises a volumetric storage medium.

15. The process of claim 1, wherein the optical data storage medium comprises an optical cube storage medium.

16. The process of claim 1, the identifying step including steps of referencing a lookup table containing multiple combinations of advancement rate and media physical composition each combination cross-referenced to a corresponding minimum write power level.

17. An apparatus for using minimal power consumption to optically store digital data on an optical data storage medium having a physical composition, said apparatus comprising:

an optical data storage unit;

a buffer to receive and store input data;

a laser;

a controller to generate an advancement signal representing a rate of advancing the optical data storage medium, said advancement signal being proportional to a quantity of write data present in the buffer, said controller being responsive to the advancement signal and the physical composition of the optical data storage medium to generate a minimum write power signal at which the laser is capable of a predetermined level of effectiveness in writing data to the optical data storage medium being advanced at a rate represented by the advancement signal;

wherein said laser is coupled the controller and the buffer, said laser writing the input data to the data storage unit using a power level representative of the write power signal; and a motor coupled to the controller and the data storage unit to advance the optical storage medium at a rate representative of the advancement signal.

18. The apparatus of claim 17, the buffer comprising a cache memory.

19. The apparatus of claim 17, the optical data storage unit comprising a single optical disk medium.

20. The apparatus of claim 19, the motor comprising an electric motor to rotate the optical disk medium at a rate representative of the advancement signal.

21. The apparatus of claim 17, the optical data storage unit comprising multiple optical disk media.

22. The apparatus of claim 17, the optical data storage unit comprising a single optical tape medium.

23. The apparatus of claim 22, the motor comprising an electric motor to move the optical tape medium from a source reel to a take-up reel past a tape head at a rate representative of the advancement signal.

24. The apparatus of claim 17, the optical data storage unit comprising multiple optical tape media.

25. The apparatus of claim 17, wherein the controller comprises a logic device.

26. The apparatus of claim 25, wherein the logic device comprises a programmable logic array.

27. The apparatus of claim 25, wherein the logic device comprises an emitter-coupled logic device.

28. The apparatus of claim 25, wherein the logic device comprises an electrically programmable memory device.

29. The apparatus of claim 17, further including a memory coupled to the controller, the memory containing a look-up table containing multiple combinations of advancement rate and media physical composition each combination cross-referenced to a corresponding minimum write power level, the controller identifying the minimum write power signal by referencing the look-up table.

30. A program storage medium tangibly embodying a program of machine-readable instructions to perform method steps for operating a laser to store digital data signals to an optical data storage medium with minimal power consumption by the laser, said optical data storage medium having a physical composition, said method steps comprising:

receiving and storing input data signals in a buffer;

detecting a quantity of the input data signals stored in the buffer;

selecting a rate for advancing the optical data storage medium, said rate being proportional to the quantity of data signals stored in the buffer;

in accordance with the selected rate and the data storage medium's physical composition, identifying a minimum write power level of effectiveness in writing data to the optical data storage medium being advanced at the selected rate;

advancing the optical data storage medium at the selected rate; and operating the laser, at the identified minimum write power level, to write at least some of the data signals to the optical data storage medium while advancing the optical data storage medium at the selected rate.

31. The program storage medium of claim 30, the method steps further comprising the steps of repeating the detecting, selecting, identifying, advancing, and operating steps.

32. The program storage medium of claim 30, wherein the optical data storage medium comprises an optical disk medium, and the advancing step comprises the steps of rotating the optical disk medium at the selected rate.

33. The program storage medium of claim 32, wherein the selected rate comprises an angular velocity.

34. The program storage medium of claim 30, wherein the optical data storage medium comprises an optical tape medium, and the advancing step comprises the steps of spooling the optical tape medium from a source reel to a take-up reel past a tape head at the selected rate.

35. The program storage medium of claim 30, wherein the buffer comprises a cache memory.

36. The program storage medium of claim 30, wherein the selecting step is performed prior to the identifying step.

37. The program storage medium of claim 30, wherein the selecting step is performed concurrently with the identifying step.

38. The program storage medium of claim 30, wherein the selecting step is performed after the identifying step.

39. The program storage medium of claim 34, wherein the selected rate comprises a linear velocity.

40. The program storage medium of claim 30, the identifying step including steps of referencing a lookup table containing multiple combinations of advancement rate and media physical composition each combination cross-referenced to a corresponding minimum write power level.

41. A process for storing digital data signals to a optical data storage medium having a physical composition, said process comprising the steps of:

receiving and storing digital data into a buffer;

detecting a quantity of digital data stored in the buffer;

selecting a rate for advancing the optical data storage medium, said rate being proportional to the quantity of digital data stored in the buffer;

in accordance with the selected rate and the data storage medium's physical composition, identifying a minimum write power level at which the data storage component is capable of a predetermined level of effectiveness in writing data to the optical data storage medium being advanced at the selected rate;

advancing the optical data storage medium at the selected rate; and operating the data storage component at the identified minimum write power level to write at least some of the digital data to the medium while advancing the medium at the selected rate.

42. The process of claim 41, the data storage component comprising a laser.

43. The process of claim 41, the data storage component comprising a magnetic field generator.

44. The process of claim 41, the data storage component comprising an electronic beam generator.

45. The process of claim 41, the identifying step including steps of referencing a lookup table containing multiple combinations of advancement rate and media physical composition each combination cross-referenced to a corresponding minimum write power level.

46. An apparatus for using minimal power consumption to optically store digital data on an optical data storage medium having a physical composition, said apparatus comprising:

an optical data storage unit;

a buffer to receive and store input data;

a data storage unit;

a controller to generate an advancement signal representing a rate of advancing the optical data storage medium, said advancement signal being proportional to a quantity of write data present in the buffer, said controller being responsive to the advancement signal and the physical composition of the optical data storage medium to generate a minimum write power signal at which the data storage unit is capable of a predetermined level of effectiveness in writing data to the optical data storage medium being advanced at a rate represented by the advancement signal;

wherein said data storage unit is coupled the controller and the buffer, said data storage component writing the input data to the data storage unit using a power level representative of the write power signal; and a motor coupled to the controller and the data storage unit to advance the optical storage medium at a rate representative of the advancement signal.

47. The process of claim 46, the data storage component comprising a laser.

48. The process of claim 46, the data storage component comprising a magnetic field generator.

49. The process of claim 46, the data storage component comprising an electronic beam generator.

50. The apparatus of claim 46, further including a memory coupled to the controller, the memory containing a look-up table containing multiple combinations of advancement rate and media physical composition each combination cross-referenced to a corresponding minimum write power level, the controller identifying the minimum write power signal by referencing the look-up table.

* * * * *

UNITED STATES PATENT AND TRADEMARK OFFICE
CERTIFICATE OF CORRECTION

PATENT NO.    : 5,625,615
DATED         : April 29, 1997
INVENTOR(S)   : Dente et al It is certified that error appears in the above-indentified patent and that said Letters Patent is hereby corrected as shown below:

Column 8, line 2, change "a" to --an--.

Column 10, line 42, change "a" to --an--.

Signed and Sealed this

First Day of August, 2000

*Attest:*

Q. TODD DICKINSON

*Attesting Officer*    Director of Patents and Trademarks